(12) United States Patent
Hague

(10) Patent No.: US 6,886,497 B1
(45) Date of Patent: May 3, 2005

(54) ANIMAL CHEWS

(76) Inventor: Frank Jay Hague, 3504 San Patricio Dr., Plano, TX (US) 75025

( * ) Notice: Subject to any disclaimer, the term of this patent is extended or adjusted under 35 U.S.C. 154(b) by 0 days.

(21) Appl. No.: 10/863,431

(22) Filed: Jun. 8, 2004

Related U.S. Application Data

(63) Continuation-in-part of application No. 10/731,257, filed on Dec. 9, 2003.

(51) Int. Cl.[7] .......................... A01K 29/00; A23B 4/027
(52) U.S. Cl. ........................................ 119/710; 426/315
(58) Field of Search ........................ 119/710, 709, 711, 119/702, 707; 426/623, 635, 805, 807, 641, 426/315

(56) References Cited

U.S. PATENT DOCUMENTS

| | | | |
|---|---|---|---|
| 3,936,527 A | | 2/1976 | Alper |
| 4,260,635 A | * | 4/1981 | Fisher ............................ 426/3 |
| 4,364,925 A | * | 12/1982 | Fisher .......................... 424/50 |
| 5,407,661 A | * | 4/1995 | Simone et al. ................. 424/49 |
| 6,067,941 A | | 5/2000 | Axelrod |
| 6,126,978 A | * | 10/2000 | Axelrod ...................... 426/285 |
| 6,200,616 B1 | | 3/2001 | Axelrod et al. |
| 6,228,402 B1 | | 5/2001 | Wolf et al. |
| 6,274,182 B1 | | 8/2001 | Axelrod et al. |
| 6,672,252 B2 | * | 1/2004 | Levin et al. ................. 119/709 |
| 2002/0119224 A1 | | 8/2002 | Axelrod et al. |
| 2002/0172752 A1 | | 11/2002 | Chizmas |
| 2003/0087008 A1 | | 5/2003 | Axelrod |
| 2003/0168020 A1 | | 9/2003 | Levin et al. |
| 2004/0009268 A1 | | 1/2004 | Axelrod et al. |

OTHER PUBLICATIONS

Greenies-The Original Smart Treat for Dogs and Other Pets, PreciousPets.org. ,www.preciouspets.org/greenies.htm, May 24, 2004, 4 pages.
Breath-Eze Specially Treated Breath Strips, Pet Street Mall, www.petstreetmall.com/merchant/canine/breathstrips.asp, May 25, 2004, 3 pages.
Breath-Eze Breathe Strips for Dogs, Watson's Senior Pet Superstore, www.seniorpetproducts.com/brbrstfordo.html, Copyright 2002-2004, 2 pages.
Edible Chew and Brush Dental Bone, www.nylabone.com/newprodcuts/chewnbrush.html, Copyright 2001-2004, TFH Publications, Inc., 1 page.
Nylabone Edible Chew & Brush Dental Bone, Mar. 2003, www.tfh.com/default.aspx?pageid=20, Copyright 2004, TFH, 1 page.

* cited by examiner

*Primary Examiner*—Yvonne R. Abbott
(74) *Attorney, Agent, or Firm*—Geoffrey A. Mantooth

(57) ABSTRACT

A chew product for use by animals is made of skin such as rawhide or pigskin. The skin is infused with chlorophyll or mint or both to freshen a dog's breath and also with sugar to increase palatability. The interior portion of the skin can be perforated, such as by cutting, before the skin is formed into a product. The perforations allow a dog's teeth to penetrate into the product and be scraped clean by the edges of the perforations. The skin is dyed green from the chlorophyll. The dyed skin can be used either alone or in conjunction with another color skin to make a product. The dyed skin and a bleached white skin combine to make an attractive product.

19 Claims, 2 Drawing Sheets

ANIMAL CHEWS

This application is a continuation-in-part application of U.S. patent application Ser. No. 10/731,257, filed Dec. 9, 2003.

FIELD OF THE INVENTION

The present invention relates to products that are chewed and eaten by animals, such as dogs, and are made of skin.

BACKGROUND OF THE INVENTION

Treats and chews are given to dogs for a variety of reasons. Chews are used to occupy the dog and help clean its teeth. Treats may have the same cleaning function, as well as provide some nutritional value.

Treats and chews can be made from a variety of materials. For example, the products can be made of processed, dried animal skin, such as rawhide (untanned cattle skin) or pigskin. The skin is processed by removing hair and cleaning it of fat and muscle. The skin is then manipulated into the desired shape, such as by folding or rolling, and then dried.

In the prior art, treats and chews can be made of materials other than hide. For example, the products can be made of plastic, rubber, etc.

Even when dogs chew on treats and chews, their breath may have an unpleasant odor and their teeth may not be cleaned. For example, on a rawhide chew, a dog has a hard time piercing the tough dried skin with its teeth. Thus, the teeth are not cleaned and the dog continues to have bad breath.

SUMMARY OF THE INVENTION

In is an object of the present invention to provide a product that an animal can chew, which product freshens the breath of the animal.

It is another object of the present invention to provide a product that an animal can chew, which product cleans the animal's teeth when chewed.

The present invention provides a method of processing animal skin to make a chew product. The skin is expanded by contacting it with an alkaline substance. The alkaline substance is removed and the skin is contacted with water and chlorophyll so that the skin takes on a green color. The chew product is formed using the green skin and the product is dried with a temperature that maintains the green color of the skin.

In accordance with another aspect of the present invention the skin is contacted not only with chlorophyll but also with mint.

In accordance with still another aspect of the present invention, the skin is contacted with chlorophyll and sugar.

In accordance with still another aspect of the present invention, the skin is contact with chlorophyll, mint and sugar.

In accordance with another aspect of the present invention, the skin is perforated before it is formed into the chew product.

In accordance with still another aspect of the present invention the skin is perforated by making cuts in an interior portion of the skin.

In accordance with another aspect of the present invention the skin is contacted with water, chlorophyll, mint and sugar, the skin is perforated and the chew product is formed by rolling the skin.

In accordance with still another aspect of the present invention, after drying the product, an aqueous solution of sugar is sprayed onto the product and the product is redried.

In accordance with still another aspect of the present invention, a non-green skin is provided. The chew product is formed with both the green skin and the non-green skin, wherein at least a portion of the green is visible.

In accordance with one aspect of the present invention, the non-green skin is a bleached skin.

In accordance with another aspect of the present invention the skin is rolled to form the product.

In accordance with still another aspect of the present invention the skin is pressed to form the product.

The present invention provides a chew product for animals which has an animal skin infused with chlorophyll. The animal skin is formed into a roll and dried.

In accordance with one aspect of the present invention the animal skin is lacerated.

In accordance with another aspect of the present invention, the animal skin is further infused with mint and sugar.

In accordance with still another aspect of the present invention, the animal skin is pigskin.

In accordance with still another aspect of the present invention at least a portion of the rolled animal skin is tied into a knot.

The present invention also provides a chew product for animals having a first animal skin infused with chlorophyll. A second animal skin is bleached. The first and second animal skins are formed into a shape so that at least a portion of the first animal skin and at least a portion of the second animal skin are visible.

In accordance with one aspect of the present invention the first animal skin is also infused with mint and sugar.

DESCRIPTION OF THE PREFERRED EMBODIMENTS

The present invention is an animal product that can be a treat or chew. The product is made from animal skin, such as pigskin or rawhide (cattle skin). Pigskin has advantages over rawhide in that pigskin is digestible by dogs and has nutritional value.

The skin is processed to remove hair, fat and muscle. The skin can also be treated to soften it, if desired. If pigskin is used, the skin is processed as follows: the skin is removed from the pig. Hair and fat and muscle are removed from the outer and inner sides of the skin. Further processing can occur on the skin while the skin is fresh, or the skin can be dried or salted and further processing delayed.

When the skin is processed further, the skin is then sliced into several layers and the layers are expanded by coating the layers with an alkaline paste, such as lime or lye, for two days. Then, the alkaline paste is removed and the skin is washed in a mild acid (such as $H_2SO_4$) to counteract the alkalinity. The skin is then dried for two days. After drying, the skin is ready to be processed into an animal product.

The skin is soaked in an aqueous solution to make it soft and also to infuse it with coloring and flavoring agents. The solution is water, chlorophyll, mint and sugar. The chlorophyll is conventional and commercially available. The mint can be peppermint, spearmint, or the oils and extracts from other members of the mint family. The sugar is Chinese red sugar. Other sugars could be used. In the preferred embodiment, the solution is, by volume, 40% water, 40% chlorophyll, 10% mint and 10% sugar. The relative amounts of the solution components can change. For example, more or less chlorophyll can be used. The skin is soaked in the solution for about 2–3 hours. During soaking, the skin can be agitated. Agitation is provided by rotating drums. The drums rotate about a horizontal axis at relatively low speeds, about 16 revolutions per minute in the preferred embodiment. The drums have ribs inside that lift and drop the skins out of and then back into the solution. The skins absorb the chlorophyll, mint and sugar. The chlorophyll, a natural dye, turns the skins green in color.

Figure 1:
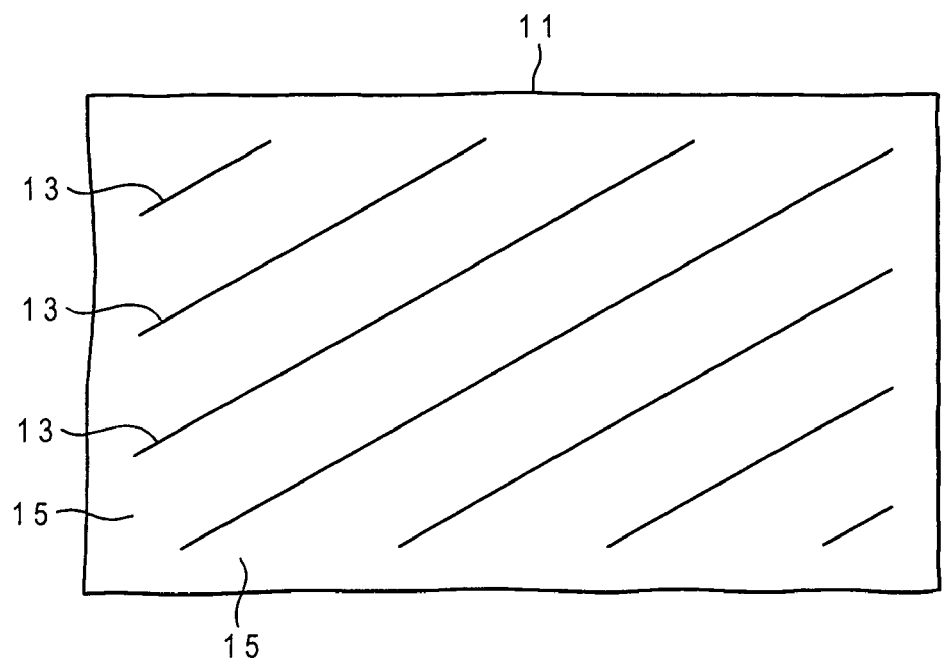
FIG. 1 is a piece of skin, processed according to the present invention, used to make an animal product.

The skins are removed from the solution. The skin is then cut in a specific shape, which is determined by the product that is to be made. In the example of FIG. 1, the skin 11 is rectangular and will used to make a roll. During the cutting process, the interior area of the skin is perforated. In the preferred embodiment, the skin is cut in a series of straight, parallel cuts 13. The outer periphery 15 of the skin is uncut so that the skin maintains its overall shape for further manipulation.

The skin 11 is then rolled to form a cylinder product roll 17. After forming, the product 17 is then dried in order to maintain the shape and prevent deterioration (see FIG. 2, which shows the dried product). In order to avoid discoloring the chlorophyll, the product is dried at a relatively low temperature. In the preferred embodiment, the product is dried in an oven at about 100 degrees Fahrenheit for 48 hours. If the temperature is too hot, the chlorophyll will turn brown, discoloring the skin.

After drying, the product is sprayed with an aqueous solution of Chinese red sugar and then dried again, wherein the product is ready for packaging and shipment.

The product is green in color and has a high palatability to dogs. The chlorophyll not only imparts the green color, but it also freshens the breath of the dog that chews the product. The mint also freshens the dog's breath. The sugar enhances palatability. The sugar that is sprayed onto the product after the initial drying step imparts some shininess to the product, enhancing its appearance.

Figure 2:
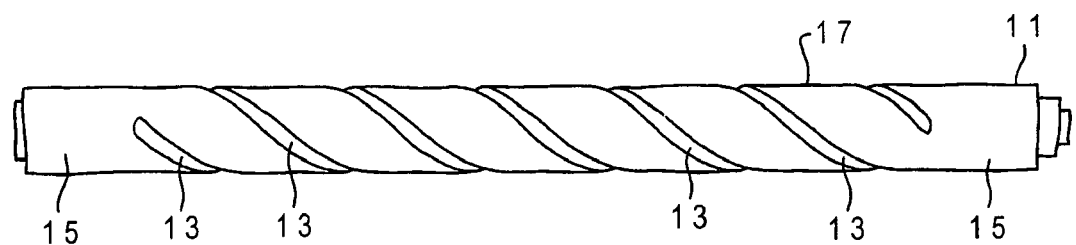
FIG. 2 is an animal product made from the skin of FIG. 1.

The rolling of the skin and the drying of the skin cause the cuts 13 to open, as shown in FIG. 2. The perforations allow the teeth to penetrate into the product 17 and also increase the amount of skin edges that the teeth can scrape against. As the dog chews the finished product, its teeth penetrate the product at the cuts. The sides of the teeth scrape against the edges of the skin. Thus, the act of chewing a perforated product produces a flossing and scraping action that helps to clean the dog's teeth.

Figure 3:
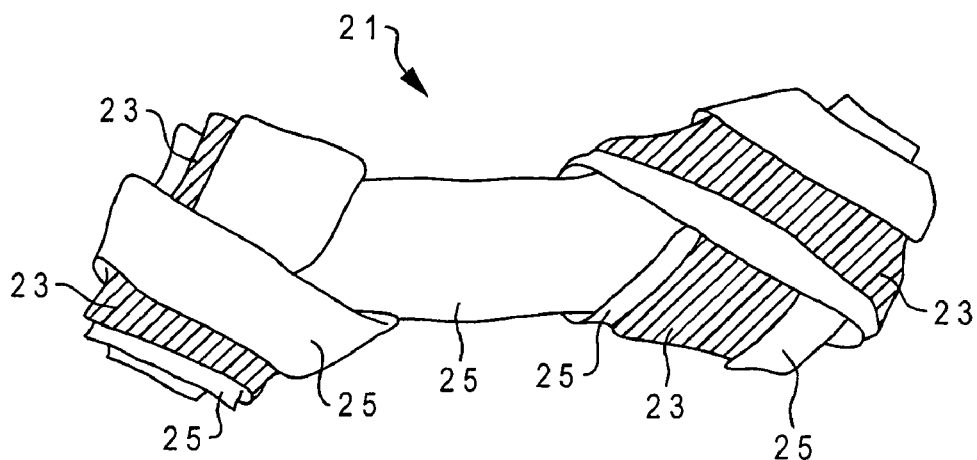
FIG. 3 is an animal product in accordance with another embodiment, made with two skins.

FIG. 3 illustrates another product 21 made of a combination of two skins. One skin is the green skin 23 discussed above, containing chlorophyll, mint and sugar. The other skin is a non-green skin 25. (In FIGS. 3–5, the green skin is shown as shaded to contrast with the non-green skin.) In the preferred embodiment, the non-green skin 25 is a bleached, white skin, which is discussed in further detail below. The product is made of three layers of skin, with the outermost layers being the bleached, white skin 25 and the inner layer being the green skin 23. The edges of the skins allow the green skin to be viewed in the final product. The skins are rolled and the ends are tied in overhand knots to form a bone shape. When finished, the edges of the green skin are visible and contrast with the white skin to form an attractive and eye appealing product. One or more of the layers can be perforated to allow the penetration and cleaning of the teeth.

Figure 4:
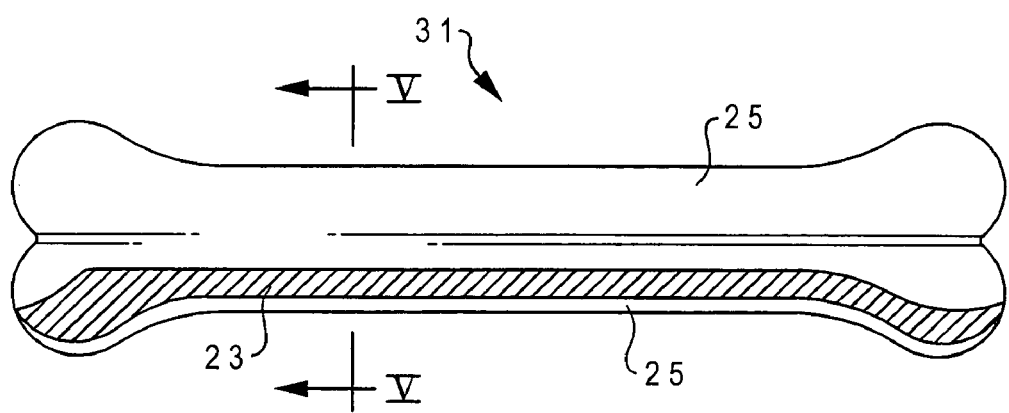
FIG. 4 is an animal product in accordance with still another embodiment.
Figure 5:
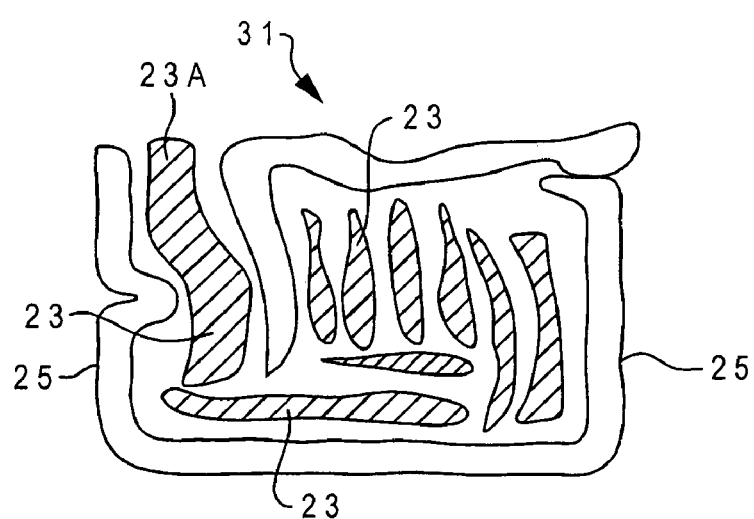
FIG. 5 is a cross-sectional view, taken through lines V—V of FIG. 4.

FIGS. 4 and 5 show a pressed product 31 made from a combination of two skins, one green 23 and the other one non-green 25. The green skin 23 is as described above, and contains chlorophyll, mint and sugar. In the preferred embodiment, the non-green skin 25 is the same bleached, white skin that is also used in the product of FIG. 3. The wet skins are put into a mold, with the non-green skin on the outside and the green skin on the inside. A portion of the green skin 23 is exposed to the outside. A narrow piece 23A of green skin is placed inside, with one edge exposed. The piece 23A is interposed between the non-green skin pieces. The skins are pressed in the mold, wherein they take on the desired shape (in FIG. 4, the product is shaped like a dog bone). FIG. 5 shows a cross-sectional view, with the non-green skin 25 on the outside and the green skin 23 on the inside. The green skin 23 is tightly compacted inside (in FIG. 5, the interior green skin is shown schematically).

In the discussion above, the green skin 11, 23 is described as having chlorophyll, mint and sugar. The skin 11, 23 need not contain all three ingredients and can only have one ingredient or any combination of two ingredients. For example, the skin 17, 23 could have chlorophyll and sugar, chlorophyll and mint, or mint and sugar.

The bleached, expanded skin 25 will now be discussed. The bleached, expanded skin is made from pigskin.

The skin is contacted with an alkali mixture to dissolve the colloidal protein therein. The mixture is 10–40% of sodium sulphide, 0.01–0.05% of alkali enzymes and a sufficient quantity of lime to raise the pH of the mixture to above or equal to 12. Typical commercially available alkali enzymes are sold under the name Nowolase DG and Nowolase NUEO.6 MPX. As an alternative to sodium sulphide, sodium hydroxide or other alkali liquids can be used. A quantity of water is added to the mixture to form a mushy paste. The mixture is applied to both sides of the pigskin. Typically, the mixture is applied to the top of a skin. Then, another skin is laid on top of the first skin and the mixture is applied to the next skin, and so on, stacking the skins. The skin may not be of a uniform thickness. The paste is daubed on thicker along the thicker portions of skin. The paste is kept in contact with the skin for an extended period of time, such as 10–30 hours, until the colloidal protein in the skin is dissolved.

In the remaining steps, the skins are agitated. Agitation is provided by rotating drums. The skins can be processed in a single drum, wherein the various chemical baths are changed, or the skins can be moved from one drum to the next and so on for each step of the process.

Throughout the process described herein, the temperature is between 10–40 degrees Celsius (C.).

After being stacked with the alkali mixture for an extended period of time, the skins, which look dirty, are loaded into a drum. The skins are washed in water to remove the alkali mixture and the colloidal protein. The protein is disposed of in accordance with accepted procedures.

Then, the skins are treated to remove the alkali mixture that has penetrated into the skins. The removal of the alkali mixture is done in two steps. First, the skins are washed with liquid ammonium chloride, chloride sulphate, or ammonium sulphide. In the preferred embodiment, the skins are agitated by a rotating drum with 1–2% ammonium chloride for 0.5–3 hours. The pH is reduced to about 6.

The skins are then rinsed with water for 0.5–3 hours.

The second step to remove the alkali mixture agitates the skins with liquid ammonium chloride (or chloride sulphate or ammonium sulphide) and enzymes. In the preferred embodiment, the enzymes used are pancreatic enzymes, such as steapsin, lipase, or zymine. Alternatively, the enzyme can be 1398 protein enzyme, which is commercially available. Other commercially available enzymes include Nowolase NS, Nowolase NG, Nowolase NB, Nowolase PE, Oropon OO, Oropon G and Oropon OR. The skin is agitated for 3–8 hours. In the preferred embodiment, 4–10% ammonium chloride and 0.1–0.5% pancreatic enzymes are used. In this step, not only is alkali removed, but the enzymes soften and expand the skin.

Removing the colloidal protein from the skin creates voids or vacuoles inside the skin. These voids are located on either inside of fibers or between the fibers, or both, inside and between the fibers. It is believed that the enzymes alter the fibers in the skin. It is believed that an outer layer of each fiber is broken. The fiber, previously constrained by the outer layer, expands from the action of the enzymes breaking the outer layer. The skin likewise expands in all three dimensions. This expansion is in addition to the swelling of the skin, which swelling occurred from immersion in lime liquid.

The two steps for removing the alkali can vary in time and depend on the concentration and quantity of the chemicals, the temperature of the components inside the drum and the speed that the drum turns. The worker or operator can adjust the times as needed.

Next, the fat is removed from the skin by agitating the skin with sodium carbonate, or soda ash, and degrease materials. The degrease materials can be a detergent, soap or surfactant. In the preferred embodiment, 1–3% sodium carbonate and 0.3–1% decrease materials are used. Then, the skin is rinsed with water.

Next, the skin is bleached by agitating the skin with 15–30% hydrogen peroxide (or potassium permanganate or other bleaching agent) for 0.5–5 hours. The hydrogen peroxide not only whitens the skin, but also assists in maintaining the expanded condition of the skin. The hydrogen peroxide and water enter and reside in the voids in the skin. The end result is a skin that is bleached, white, expanded, soft and low in oil. The skin is pleasant in appearance to humans and has a high palatability to dogs.

The skin is pressed to reduce the amount of water therein. Then it is cut and shaped and manipulated while still wet to form the desired product.

The bleached expanded pigskin 25 is opaque, while the oily and unexpanded pigskin 11, 23 is somewhat translucent, due to the oils in the skin. I have found that for appearance, the oily unexpanded pigskin takes the chlorophyll better. The bleached expanded pigskin also takes the chlorophyll, mint and sugar but the appearance is not as attractive. In order to maintain the clean, bleached look, products using bleached expanded pigskin are not sprayed with sugar. The bleached expanded pigskin can contain mint, as the mint is clear and does not affect appearance.

By providing a product where the skin has been soaked in breath freshening ingredients, the breath freshening ingredients last throughout the chewing of the product. This is in contrast to products that have been coated with chlorophyll, which coating is easily licked off by the dog before much chewing has taken place to the product.

The foregoing disclosure and showings made in the drawings are merely illustrative of the principles of this invention and are not to be interpreted in a limiting sense.

What is claimed is:

1. A method of processing animal skins to make a chew product, comprising the steps of:
   a) expanding the skin by contacting the skin with an alkaline substance;
   b) removing the alkaline substance;
   c) contacting the skin with water and chlorophyll so that the skin takes on a green color;
   d) forming the chew product with the green skin;
   e) drying the product at a temperature that maintains a green color of the skin.

2. The method of claim 1 wherein the step of contacting the skin with water and chlorophyll further comprising the step of contacting the skin with water, chlorophyll and mint.

3. The method of claim 2 wherein the step of contacting the skin with water and chlorophyll further comprising the step of contacting the skin with water, chlorophyll, mint and sugar.

4. The method of claim 1 wherein the step of contacting the skin with water and chlorophyll further comprising the step of contacting the skin with water, chlorophyll, mint and sugar.

5. The method of claim 1 further comprising the step of, before forming the chew product, forming perforations in the skin.

6. The method of claim 5 wherein the step of forming perforations in the skin further comprises the step of making cuts in an interior portion of the skin.

7. The method of claim 1 wherein:
   a) the step of contacting the skin with water and chlorophyll further comprises the step of contacting the skin with water, chlorophyll, mint and sugar;
   b) perforating the skin;
   c) the step of forming the chew product further comprises the step of rolling the skin.

8. The method of claim 1 further comprising the step of, after drying the product, spraying an aqueous solution of sugar onto the product and then redrying the product.

9. The method of claim 1, further comprising the steps of:
   a) providing a non-green skin;
   b) the step of forming the chew product further comprises the step of forming the chew product with both the green skin and the non-green skin, wherein at least a portion of the green skin is visible.

10. The method of claim 9 wherein the step of providing a non-green skin further comprises the step of providing a bleached skin.

11. The method of claim 10 wherein the step of forming the product further comprises the step of rolling the skin.

12. The method of claim 10 wherein the step of forming the product further comprises the step of pressing the skins.

13. A chew product for animals; comprising:
   a) an animal skin infused with chlorophyll;
   b) the animal skin formed into a roll and dried.

14. The chew product of claim 13 wherein the animal skin is lacerated.

15. The chew product of claim 14 wherein the animal skin is further infused with mint and sugar.

16. The chew product of claim 13 wherein the animal skin is pigskin.

17. The chew product of claim 13 wherein at least a portion of the rolled animal skin is tied into a knot.

18. A chew product for animals, comprising:
   a) a first animal skin infused with chlorophyll;
   b) a second animal skin that is bleached;
   c) the first and second animal skins formed into a shape so that at least a portion of the first animal skin and at least a portion of the second animal skin are visible.

19. The chew product of claim 18 wherein the first animal skin is also infused with mint and sugar.

* * * * *